United States Patent
Post et al.

(10) Patent No.: US 10,108,947 B2
(45) Date of Patent: Oct. 23, 2018

(54) SMART CARD READER WITH PUBLIC KEY INDEX ON HOST DEVICE

(71) Applicant: Square, Inc., San Francisco, CA (US)

(72) Inventors: Dan Post, San Francisco, CA (US); Dave Terra, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 853 days.

(21) Appl. No.: 14/448,714

(22) Filed: Jul. 31, 2014

(65) Prior Publication Data

US 2016/0034881 A1 Feb. 4, 2016

(51) Int. Cl.
 *G06Q 20/34* (2012.01)
 *G06Q 20/20* (2012.01)
 *G07F 7/08* (2006.01)

(52) U.S. Cl.
 CPC ......... *G06Q 20/204* (2013.01); *G06Q 20/341* (2013.01); *G07F 7/0873* (2013.01)

(58) Field of Classification Search
 CPC . H04L 9/32; G06F 21/30; G06F 21/34; G06F 21/445; G06Q 20/02; G06Q 20/38215; G06Q 20/40; G06Q 20/204; G06Q 20/3574; G06Q 20/3829
 See application file for complete search history.

(56) References Cited

U.S. PATENT DOCUMENTS

| | | | |
|---|---|---|---|
| 6,213,392 B1 * | 4/2001 | Zuppicich | G06K 7/0004 235/375 |
| 6,230,267 B1 | 5/2001 | Richards et al. | |
| 6,698,654 B1 * | 3/2004 | Zuppicich | G06K 7/0004 235/375 |
| 6,763,399 B2 * | 7/2004 | Margalit | G06F 21/34 710/13 |
| 6,871,278 B1 * | 3/2005 | Sciupac | G06Q 20/382 705/64 |
| 6,945,454 B2 * | 9/2005 | Tournemille | G06K 7/0008 235/375 |

(Continued)

FOREIGN PATENT DOCUMENTS

WO 2016/019206 A1 2/2016

OTHER PUBLICATIONS

International Search Report and Written Opinion for PCT Application No. PCT/US2015/043027, dated Nov. 4, 2015.

*Primary Examiner* — Florian M Zeender
*Assistant Examiner* — Milena Racic
(74) *Attorney, Agent, or Firm* — Polsinelli PC (57) ABSTRACT

Aspects of the subject disclosure provide a reader device for managing transactions using financial instruments with encrypted data storage devices, such as integrated circuit cards (ICC). In some implementations, a reader device of the subject technology can be configured to access the encrypted information in an ICC via an index or table of keys stored on a host device. In operation, upon detecting an ICC, the reader device can obtain application or protocol information for the ICC and concurrently pre-fetch keys from the host device, so that the pre-fetched keys are received prior to or concurrently with the application or protocol information. In the event that the pre-fetch fails to provide the keys needed for the application or protocol of the ICC, the reader device can make a specific request for the exact keys needed for the application or protocol.

19 Claims, 4 Drawing Sheets

(56) References Cited

U.S. PATENT DOCUMENTS

| | | | | |
|---|---|---|---|---|
| 7,357,309 B2* | 4/2008 | Ghosh | ............... | G06Q 20/045 |
| | | | | 235/380 |
| 7,587,756 B2* | 9/2009 | Peart | ............... | G06Q 20/04 |
| | | | | 380/232 |
| 8,117,453 B2* | 2/2012 | Huque | ............... | G06Q 20/341 |
| | | | | 713/156 |
| 9,607,298 B2* | 3/2017 | Brudnicki | ............... | G06Q 20/3226 |
| 9,665,867 B2* | 5/2017 | Guise | ............... | G06Q 20/3829 |
| 9,667,426 B2* | 5/2017 | Sekiya | ............... | H04L 9/3247 |
| 9,736,144 B2* | 8/2017 | McCanna | ............... | H04L 63/0823 |
| 9,740,849 B2* | 8/2017 | Etchegoyen | ............... | G06F 21/44 |
| 9,760,962 B2* | 9/2017 | Lese | ............... | G06Q 50/24 |
| 9,769,134 B2* | 9/2017 | Dominguez | ............... | H04L 63/08 |
| 9,788,205 B2* | 10/2017 | Sarmah | ............... | H04W 12/06 |
| 9,836,594 B2* | 12/2017 | Zhang | ............... | G06F 21/44 |
| 9,836,601 B2* | 12/2017 | Pulapaka | ............... | G06F 21/56 |
| 2007/0118736 A1* | 5/2007 | Huque | ............... | G06Q 20/341 |
| | | | | 713/155 |
| 2007/0241182 A1* | 10/2007 | Buer | ............... | G06Q 20/341 |
| | | | | 235/380 |
| 2008/0123862 A1 | 5/2008 | Rowley | | |
| 2008/0159543 A1* | 7/2008 | Frisch | ............... | H04L 9/3263 |
| | | | | 380/282 |
| 2008/0301056 A1* | 12/2008 | Weller | ............... | G06Q 20/02 |
| | | | | 705/67 |
| 2009/0103725 A1 | 4/2009 | Tang et al. | | |
| 2009/0150294 A1* | 6/2009 | March | ............... | G01S 5/0027 |
| | | | | 705/67 |
| 2009/0198618 A1* | 8/2009 | Chan | ............... | G06Q 20/02 |
| | | | | 705/66 |
| 2012/0211558 A1* | 8/2012 | Buer | ............... | G06Q 20/341 |
| | | | | 235/375 |
| 2013/0185559 A1* | 7/2013 | Morel | ............... | H04L 63/18 |
| | | | | 713/168 |

* cited by examiner

SMART CARD READER WITH PUBLIC KEY INDEX ON HOST DEVICE

BACKGROUND

An increasing number of hardware attachments are available to expand upon the functional capabilities of mobile computing devices, such as smart phones. In some instances, card reader attachments, which enable the reading of payment information from a magnetic strip (such as a credit card), can be coupled to a host device via a standard 3.5 mm headphone port. However, such credit cards can be duplicated by copying the data stored on the magnetic strip and storing the data on the magnetic strip of a counterfeit card. Moreover, there is no reliable method for easily authenticating such credit cards based on the information in the magnetic strip. As a result, magnetic strip devices are generally considered to provide only limited security features.

In response to such security issues, credit card issuers have begun providing consumers with integrated circuit credit cards (ICC), sometimes referred to as smart cards or chip cards. ICC's may include the same features present in traditional credit cards (i.e., embossed and printed information, magnetic strip, and signature block), but also include a chip. This chip is essentially a memory device that stores not only account information for the ICC, but also authentication information for the ICC. This information is encrypted to prevent copying or tampering. To process a transaction using an ICC, a point-of-sale (POS) terminal is configured for retrieving and storing public keys (PK) obtained from a certificate authority (CA) or other trusted third party, usually in the form of certificate authority public key tables or indices (CAPK table or index) of available keys for all protocols, detecting the chip (either in a contact or contactless mode), determining an application or protocol associated with the ICC's chip, and finding and using a corresponding public key associated with the protocol to decrypt the data on the chip, authenticating the ICC, and allowing the requested transaction to be carried out once authentication is successful. In some cases, this can require input of a personal identification number (PIN) by a customer into the POS terminal. Additionally, such POS terminals are also typically configured for processing conventional credit card transactions.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear that the subject technology is not limited to the specific details set forth herein and may be practiced without these specific details. In some instances, structures and components are shown in block diagram form in order to avoid obscuring the concepts of the subject technology.

As noted above, a POS terminal associated with processing of ICC's is required to perform various data retrieval, data storage, and data processing tasks to support the processing of both ICC's and conventional credit cards. Essentially, this translates into requiring such POS terminals to include a larger number of hardware components as compared to traditional magnetic strip POS terminals. For example, the downloading and storage of a CAPK index requires additional memory components. In another example, the additional decryption/authentication processing required for ICC's can require more powerful or complex processing capabilities within the POS terminal.

In the case of POS terminals with traditional form factors (e.g., countertop POS terminals, cash register systems, vending machine card readers, and gas station card readers), the inclusion of additional components in order to manage ICC's is negligible in terms of cost and performance. However, the addition of such additional components can be problematic for portable reader devices, such as credit card reader attachments and especially those communicating via the headphone port. First, modifying a conventional reader device to include additional memory required for storing a CAPK index can increase the cost, size, and power requirements required for the reader device. Second, even if a host device has broadband access to retrieve the CAPK index quickly from a CA, it can take a while to transfer the CAPK index from the host device to the reader device due to the relatively low speed connection via the headphone port. Thus, the speed and convenience for payment processing offered by conventional card reader attachments can quickly evaporate.

The present technology addresses the foregoing problems by providing means by which the need for storing a CAPK index (or any other type of table or index of decryption keys) on the reader device can be reduced or eliminated. In particular, the present technology is directed to a reader device configured for accessing, authenticating ICC's and thereafter processing transactions, using a CAPK index stored on a host device running a merchant transaction processing application, which typically has a significant amount of memory available, rather than a CAPK index stored on the reader device. In operation, the reader device determines application identifying information from the ICC forwards at least one request to the host for entries from the CAPK index corresponding to the application identifying information. In particular, the first request identifies only a category of ICC applications and the host returns likely candidates. A second, more specific request can then follow if the likely candidates fail to include the needed entry from the CAPK index. Thereafter, the ICC can be authenticated and the transaction can be processed using information obtained from the ICC. Such a configuration does not defeat the security features for authenticating the ICC.

In a traditional POS terminal configured for transactions involving an ICC, the POS terminal is configured to access the ICC, receive, store, and process the CAPK index, and manage the transaction. Thus, traditional POS terminals are typically configured with security features to prevent a third party from tampering with the data from the CAPK index of data received from the ICC and performing unauthorized transactions. In the present technology, although the reader can be configured to be secure, because communications with the host device occur over an audio channel and other vulnerabilities of the host device (e.g., jailbreaking or other hacking) result in the host device lacking the security features present in traditional POS terminals. As a result, although the CAPK index is stored on an insecure host device and the the CAPK index may be vulnerable to tampering while stored on the host device, the built-in encryption features of ICC processing prevent fraudulent transactions. In particular, tampering of an entry for an ICC application associated with the ICC will cause the authentication process, the decryption process, or a subsequent transaction process to fail, as the use of altered keys will not generate the valid data for one or more of these processes.

Although the various embodiments will be described primarily with respect to transactions involving ICC's configured in accordance with the Eurpopay, Mastercard, and Visa (EMV) standard, the various embodiments are not limited in this regard. In other configurations, the secure information need not be stored on a chip or integrated circuit. Rather, any other means for storing data in an encrypted form can be used in the various embodiments.

Figure 1:
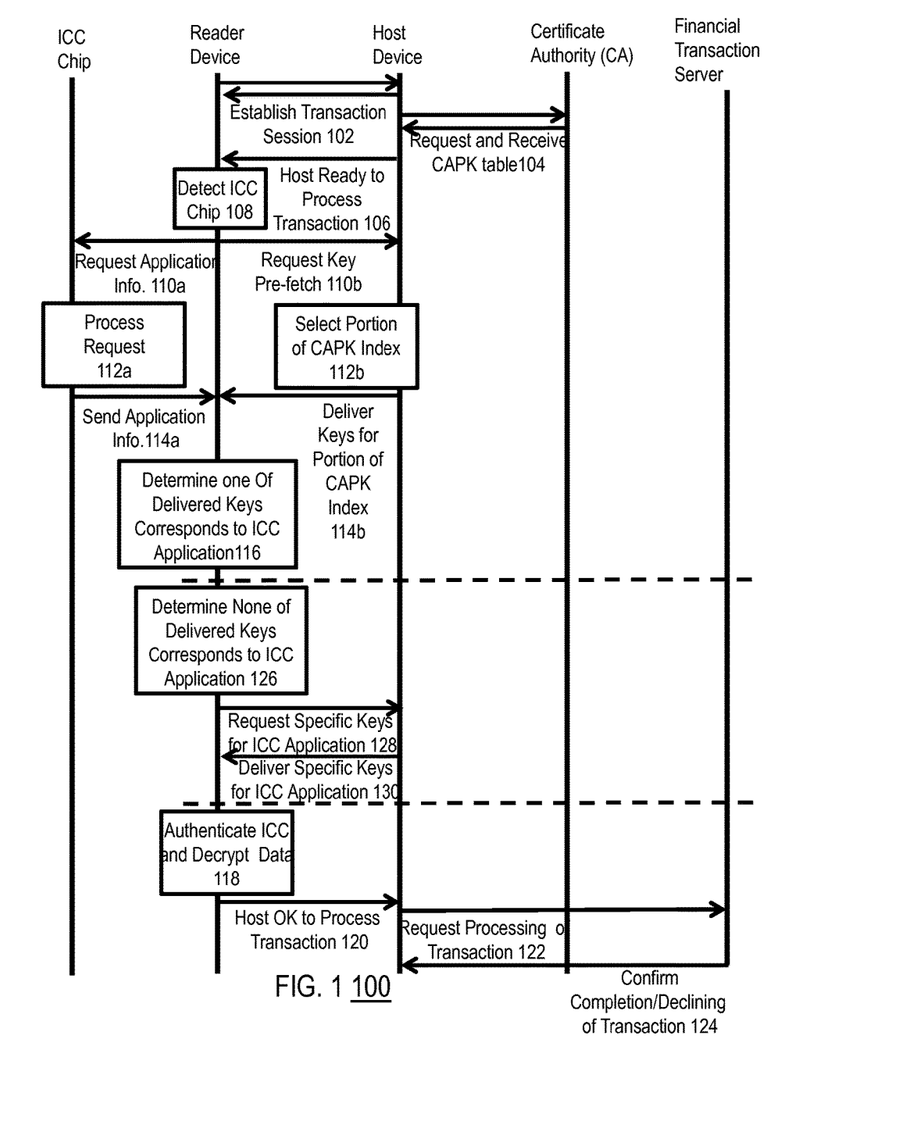
FIG. 1 illustrates an exemplary timing diagram that illustrates the function of the various components in the present technology.

The operation of the various embodiments is illustrated with respect to FIG. 1. FIG. 1 illustrates an exemplary timing diagram 100 that illustrates the function of the various components in the present technology. Although the timing diagram 100 illustrates a specific order of events, the various embodiments are not limited in this regard. Further, reader devices and host devices configured in accordance with the present technology are not limited solely to performance of the processes shown in FIG. 1. Rather, more or less events than shown in FIG. 1 can occur. Moreover, other events can occur concurrently with those illustrated in FIG. 1.

As shown in FIG. 1, transaction processing can begin with the establishment of a transaction session between a reader device and a host device (102). This can involve the user plugging in a reader device into the host device, the user initializing the merchant transaction processing application at the host device, and initial negotiation or handshaking between the reader device and the host device to establish communications links between the reader device and the host device. Contemporaneously, the host device can communicate with the CA to request and retrieve CAPK indices for performing transactions using ICC's (104). In some configurations, the request can be automatically generated upon initializing the merchant transaction processing application at the host device. In other configurations, the request can be generated based on the reader device. That is, particular reader devices can require certain CAPK indices. In yet other configurations, the CAPK index may already be stored at the host device (e.g., because the CAPK index was previously downloaded to the host device by the merchant transaction processing application, or because the CAPK index was embedded in the merchant transaction processing application at the time when the merchant transaction processing application was downloaded and installed on the host device, etc.). Thus, the request at 104 can encompass instead requesting the CA to confirm that the stored CAPK index is up to date. In the case it is not, the CAPK index at the host device can be updated or replaced. In still yet other configurations, the CAPK index may already be stored at the host device, and thus the request at 104 can be omitted altogether.

Once the transaction session is established (102) and the CAPK index is obtained by the host device (104), the host device can indicate that it is ready to process transactions. In some configurations, this can involve generating an audio, visual, or other notification at the host device for the user, indicating that the transactions can be performed. In other configurations, the host device can generate a signal for the reader device to enable components thereon. Regardless, a transaction can then be performed.

A transaction begins with the detection of an ICC chip by the reader device (108) when, for example, a merchant dips the ICC chip into a slot on the reader device. In this respect, the reader device can be configured to detect and read ICC chips via contact means, contactless means, or both.

During detection (108), the initial interactions between the reader device and the ICC chip can result in some limited information being provided regarding the application on ICC chip, such as an application type identifier. For example, ICC chips for the EMV standard are configured to utilize an application identifier (AID) consisting of two portions: (1) a five byte registered application provider identifier (RID) corresponding to an issuer or card scheme (e.g., Visa) and (2) a proprietary application identifier extension (PIX) following the RID, identifying a specific product for the issuer or card scheme (e.g., debit cards, ATM cards, credit cards, etc.) In the case of debit cards, the PIX is typically "1010". Accordingly, during detection of the chip 108 or at some point thereafter, the reader device can receive the PIX, which is an application type identifier for the ICC, and can thereafter include the PIX as part of the pre-fetch request for the host device. Thereafter, the host device can identify the AID's most commonly associated with such a PIX and deliver the corresponding keys from the CAPK index to the reader device. However, the various embodiments are not limited in this regard and any other methods for identification of ICC application type can be used in the various embodiments. At this point, the reader device engages in parallel operations.

A first set of operations (110*a*, 112*a*, 114*a*) is provided between the reader device and the ICC chip. This set first involves the reader device requesting or accessing the ICC chip for additional application information for the ICC chip (110*a*). For example, where some information has already been provided (e.g., such as the PIX), this step involves the remaining information for completely identifying the ICC application (e.g., the remainder of the AID). Such information may be stored on the ICC chip in the clear, as it contains nothing more than an identifier of the ICC application associated with the ICC chip and not any user-specific information. In response to this request, the logic in the ICC chip can process the request (112*a*) and thereafter the ICC application information is provided or otherwise made accessible to the reader device (114*a*).

A second set of operations (110*b*, 112*b*, 114*b*) is performed in parallel or contemporaneously with the first set of operations. This second set involves operations between the reader device and the host device that first involve requesting a key pre-fetch from the host device (110*b*) on the basis of the received application type identifier. That is, a request for providing to the reader device a subset of keys from the CAPK index in stored in the host device. Thereafter, the host device can select the subset of key (112*b*) and thereafter the subset of keys is delivered or otherwise made accessible to the reader device (114*b*).

In the various embodiments, the reader device and the host device are configured so that the second set of operations is completed prior to completion of the first set of operation, or at least contemporaneously, concurrently, or at approximately at the same time as the first set of operations are completed. As used in this context, the terms "contemporaneously", "concurrently", "approximately at the same time", or equivalents thereof, means that the time for completion of the first set of operations and the time of completion of the second set of operations are within 20% of each other. In certain embodiments, these times can be within 5%, 10%, or, 15% of each other.

In view of the foregoing, the present disclosure contemplates that potential keys are available at the reader device either prior to receipt of the additional ICC application information at the reader device or soon thereafter. Thus, in the case of a successful pre-fetch, the full ICC application information (i.e., the application type identifier and additional application information) and the corresponding key information will be available contemporaneously at the reader. As such, the pre-fetch process reduces the amount of time required for a transaction, if the pre-fetch successfully provides a matching key. In some embodiments, this can mean that the number of keys that are included in the pre-fetch can vary. That is, although the timing for the first set of operations (ICC chip/reader device) is going to be consistent in most cases, the timing for performing the second set of operations (reader device/host device) to retrieve a particular number of key may vary. For example, connection quality and speed between the host device and the reader device can vary, as well as processing capabilities at the host device and the reader device can vary, the timing The present disclosure contemplates that selection of subset of keys can be static or dynamic. As to the former, a subset can be pre-defined at the host device and the host device can always forward the same keys in response to a pre-fetch request. As to the latter, the subset of keys can vary according to various criteria, including, but not limited to, location. For example, a first group of applications for an application type may be more common in a first geographic location and a second, different group of applications for the same application type may be more common in a second geographic location. Thus, the host device can first determine its location and then select the appropriate keys to deliver to the reader device based on the applications associated with the location.

In response to receiving the selected keys from the host device, the reader device can determine whether any of the keys corresponds to the ICC application for the ICC chip (116), e.g., by comparing the keys received (114b) to the full application information, or portions thereof, available at the reader device. If so, the reader device can authenticate the ICC and proceed with decryption of data therein using the correct key (118). Thereafter, the reader device can authorize the host device to process the transaction (120). The host device can then request a financial transaction server to perform processing of a transaction using the financial information associated with the ICC (122). Finally, the financial transaction server can confirm completion or a declining of the request transaction (124).

As noted above, the processing can involve providing multiple security features to ensure that the CAPK index was not tampered with. For example, the reader device can forward an encrypted packet to the host device. The host device can then include such a packet in any request to the financial transaction server to perform a transaction. The packet can then be subsequently decrypted and checked at the financial transaction server to ensure that the request is legitimate or that at least has been initiated by a properly authenticated ICC.

In some configurations, it is not necessary to request keys each time an ICC chip is detected. In particular, previously delivered keys can be stored at the reader device. Thus, prior to generating the request, the present disclosure contemplates that upon detecting the ICC chip (108), a check can be performed to determine whether or not a pre-fetch was previously performed. If so, then a second pre-fetch is not performed. In cases where application type identifier information is available (e.g., the PIX is available at the reader device), this can further involve detecting whether the previously delivered keys correspond to the application identifier type information currently available for the ICC chip. If not, a second pre-fetch can be performed. Thereafter, the reader device can proceed as described in FIG. 1, starting at step 116 to determine if a needed key is present for the particular ICC application at the ICC chip and to retrieve additional keys as needed.

As noted above, at 114b, the host device can deliver the keys for the most common or likely ICC applications corresponding to, for example, the ICC application type at the reader device or a location of the host device. However, in some cases, the ICC chip may be associated with an uncommon ICC application. Thus, instead of the reader device determining, at 116, that one of the delivered keys corresponds to the ICC application, the reader device instead determines that none of the delivered keys corresponds to the ICC application for the ICC chip (126). In response to not receiving the needed keys, the reader device makes a second request for the keys specific to the ICC application at the ICC chip (128), e.g., on the basis of the full application information or portions thereof. The host device then provides the key to the card reader (130). Thereafter, the ICC chip can be authenticated and the transaction can be performed, as described above.

It is noted that the reader device is capable of requesting the specific keys that it needs each time an ICC is detected. However, there are several advantages of utilizing the scheme set forth in FIG. 1. First, a reader device can be implemented using a smaller amount of memory than typically required for a POS terminal. Thus, size, power, and portability of the reader device are enhanced by leveraging the storage capabilities of the host device. Second, by requiring the reader device to provide only ICC application type information, the requests transmitted from the reader device to the host device are shorter and therefore use less of the limited bandwidth available between the reader device and the host device. Third, since the likelihood additional fetching of key information is low, transaction delays will be minimal. In particular, since certain ICC applications (e.g., credit card types) are more common than others for certain ICC application types, there is a low likelihood that the needed keys will not be provided by the pre-fetch occurring in response to an initial request from the reader device. Thus, any additional fetching typically occurs infrequently. Further, even when such additional fetching is necessary, the infrequent additional fetching means that the total delays are minimized or are negligible. (Card reading processes are typically on the order of 1-2 seconds, while fetch processes are typically on the order to ⅛ to ¼ seconds.) Accordingly, the overall performance of the POS terminal provided by the reader device and the host device is not significantly reduced as compared to conventional POS terminals for ICC's.

Figure 2A:
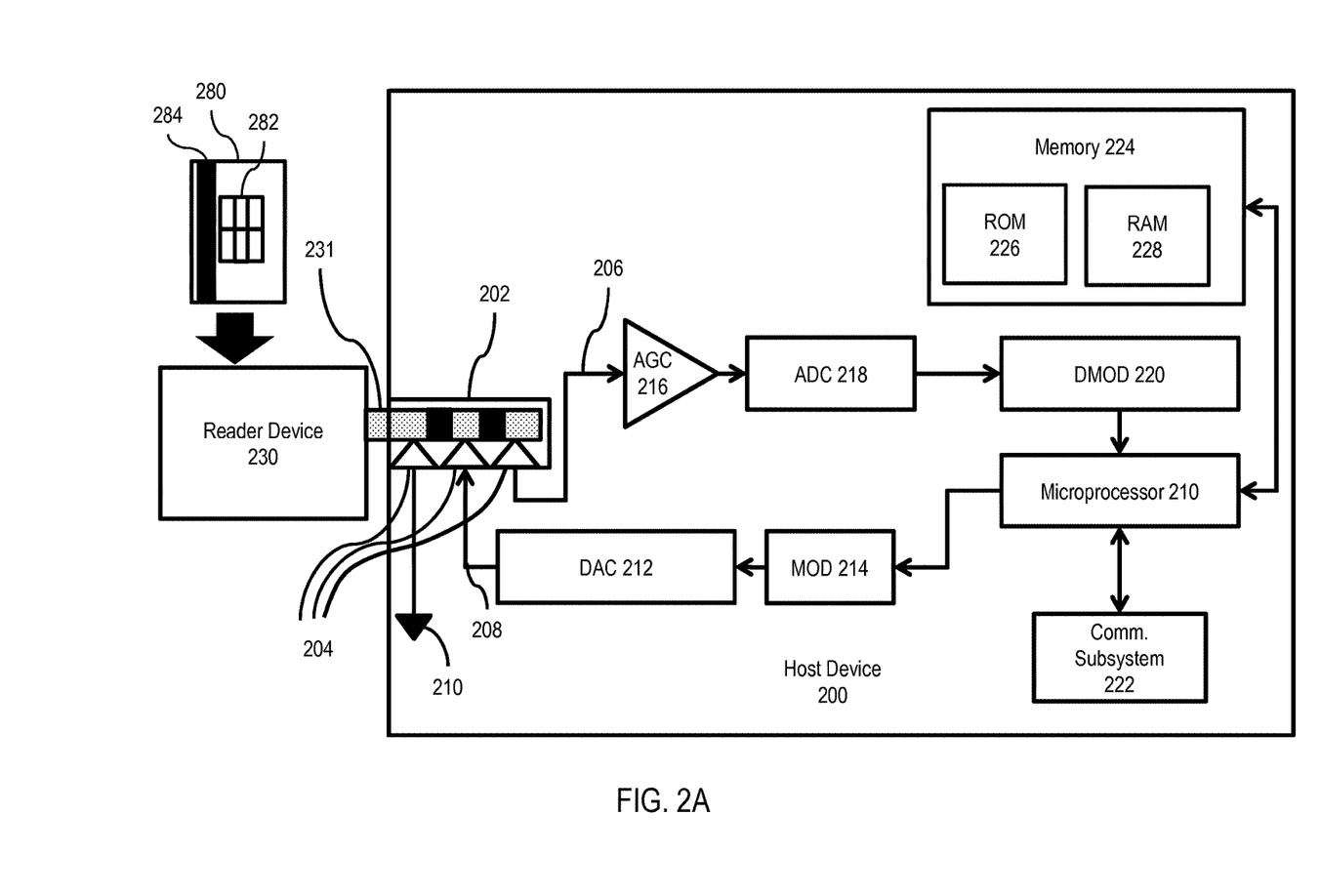
FIGS. 2A and 2B show conceptual block diagrams illustrating hardware components used to provide a POS system consisting of a reader device and a host computing device.

The operation of a reader device configured according to the present technology is further described below with respect to a POS system provided by the components in FIGS. 2A and 2B. Turning first to FIG. 2A, there is shown a conceptual block diagram of host device 200 and a reader device 230 configured according to the present technology. The host device 200 can be any network enabled device. Although the various embodiments will be described primarily with respect to a smart phone configuration for the host device 200, the present technology is not limited in this regard. Thus, host device 200 can also be, for example, any of a desktop computer, a mobile computer, a handheld communications device (e.g., mobile phones, smart phones, and tablets), a smart television set, a set-top box, or a gaming console.

FIG. 2A shows an exemplary configuration for host device 200. However, the present disclosure contemplates that a host device can include more or less components than shown in FIG. 2A. As shown in FIG. 2A, host device 200 can include an audio port 202 for receiving a connector 231 of reader device 230. In the exemplary configuration of FIG. 2, the audio port 202 is a headphone jack and the connector 231 is a corresponding headphone plug. For each contact in connector 231, the audio port 202 provides corresponding terminals 204 to connect the contacts in connector 231 to different parts of the host device 200. For example, as shown in FIG. 2A, the terminals 204 are configured to connect a first contact of connector 231 to an audio input channel 206 of host device 200, connect a second contact of connector 231 to an audio output channel 208 of host device 200, and connect a third contact of connector 231 to a ground plane of host device. Each of these channels, along with corresponding portions of the audio port 202, terminals 204, and connector 231, and the corresponding channels in reader device 230 each define signal paths.

It should be noted that while FIG. 2A illustrates specific connections between reader device 230 and portions of host device 200, the present disclosure contemplates that circuitry can be provided in host device 200 with logic to automatically route signals from connector 231 to appropriate circuits in host device 200. For example, multiplexing circuits or other types of routing circuits can be provided in host device 200. Further, although connector 231 and host device 200 are shown in FIG. 2A as including only three contacts and three terminals, respectively, the present disclosure contemplates that any number of contacts can be provided in the various embodiments.

The audio output channel 208 can be coupled to a microprocessor 210 of host device 200 via a digital-to-analog converter (DAC) 212 and modulator (MOD) 214. Thus, when the microprocessor 210 generates digital data for the reader device 230, the digital data is transmitted as digital signals to MOD 214 to encode the digital signals into a modulated signal embodying the digital data and thereafter to DAC 212 to convert the modulated signal into an analog signal suitable from transmission over audio output channel 208 to reader device 230. The audio input channel 206 can be coupled to microprocessor 210 of host device 200 via an ACG sub-circuit 216 and a signal processing system defined by an analog-to-digital converter (ADC) 218 and demodulator (DMOD) 220. Thus, when a signal is received on the audio input channel 206, the ACG sub-circuit 216 adjusts the gain to improve SNR. Thereafter the amplified signal is converted from an analog signal to a digital signal by ADC 218. Finally, the digital signal is demodulated at DMOD 220 to provide the data to microprocessor 210. Via audio input channel 206, audio output channel 208, and associated components, the host device 200 can engage in bidirectional communications with the reader device 230 using audio signaling, e.g., carrier waves representing audio signals.

The microprocessor 210 can be coupled to a communications subsystem 222 and a memory 224, which can include read-only memory (ROM) 226 and random-access memory (RAM) 228. In the various embodiments, microprocessor 210, the communications subsystem 222, and the memory 224 can be the main microprocessor, communications subsystem, and memory for the host device 200 or for a subsystem thereof. Accordingly, the communications subsystem 222 can directly communicate with a network and devices beyond or can simply be used to communicate with other portions of host device 200. Further, the memory 224 can be utilized for storing information associated solely with a merchant transaction processing application that is executed by the microprocessor 210 or can be used for any other application at the host device 200.

Figure 2B:
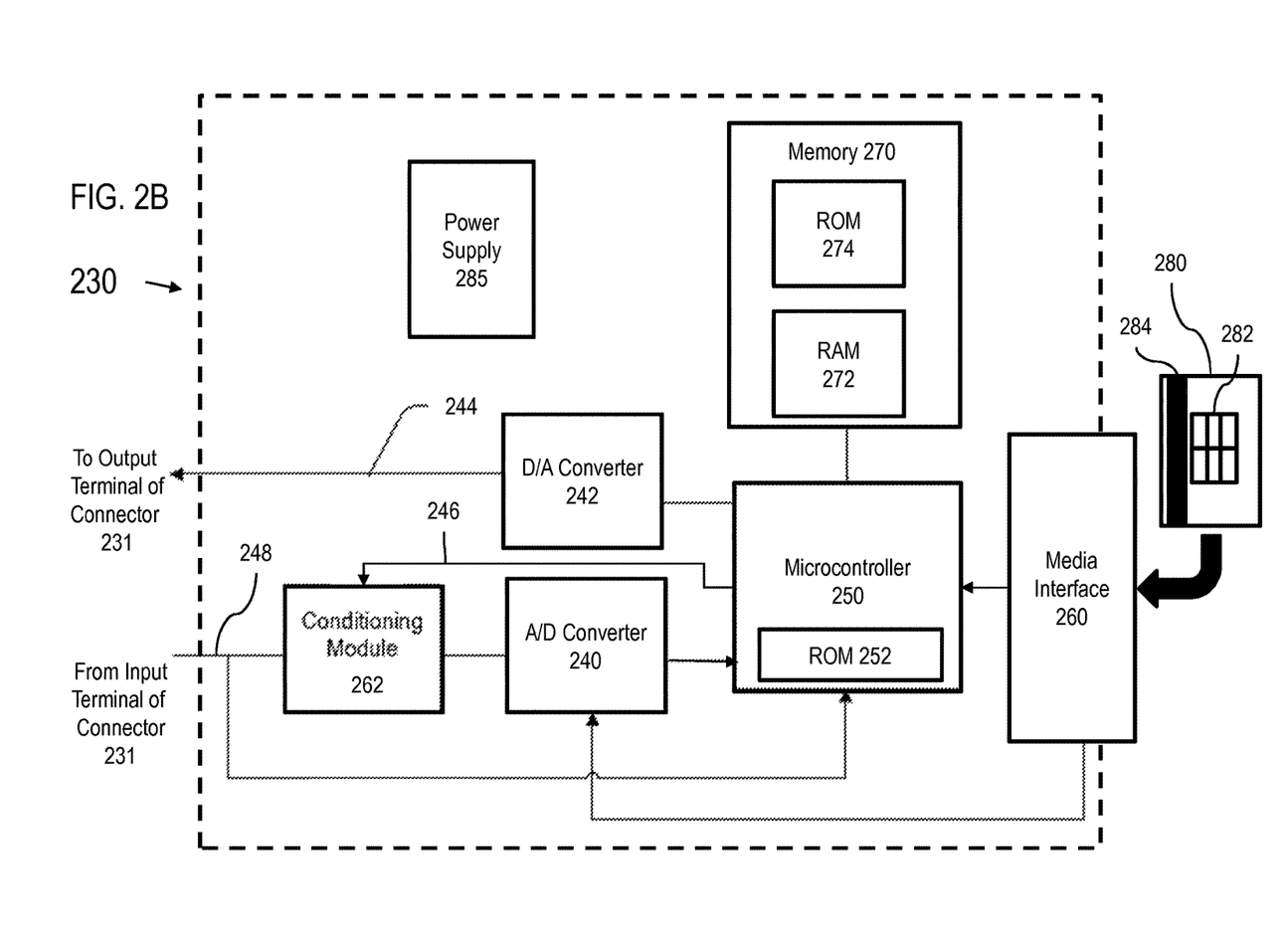

Now turning to a more detailed description of the reader device 230, FIG. 2B illustrates a conceptual block diagram of hardware components for a reader device 230 configured in accordance with the present technology. Reader device 230 includes a processor or microcontroller 250, memory 270, digital-to-analog converter (DAC) 242, analog-to-digital converter (ADC) 240, conditioning module 262, media interface 260, and power supply 285.

As illustrated in FIG. 2B, microcontroller 250 is coupled to memory 270, DAC 242 and ADC 240. Additionally, microcontroller 250 is coupled to conditioning module 262, via audio input channel 248, as well as media interface 260 for reading a media item 270 including financial information, either directly or via ADC 240. In turn, ADC 240 is coupled to conditioning module 262, via audio input channel 248. Via DAC 242, audio input channel 244, ADC 240, and audio output channel 248, the reader device 230 can engage in bidirectional communications with the host computing device using audio signaling, e.g., carrier waves representing audio signals.

In some embodiments, to reduce the number of components necessary in the reader device 230, various components can be configured to perform multiple tasks within the card reader 242. For example, ADC 240 can be configured for handling the conversion of analog signals obtained from media interface 260 (e.g., during a swipe of a magnetic strip 272 of media item 270) to digital signals for use by the microcontroller 250 and also for handling the conversion of analog signals received via audio input channel 248 to digital signals for use by the microcontroller 250. In the case the media item 270 is an ICC, the digital signals from a chip 274 in media item 270 can be provided directly to microcontroller 250.

The microcontroller 250 can control DAC 242 to adjust the output characteristics of any audio signaling provided on audio output channel 244. These can include, but are not limited to, gain and frequency band of any amplifier in DAC 242. Additionally, the microcontroller 250 can adjust the frequency, amplitude, and phase for the modulation scheme used to encode digital data into the audio signaling. The present disclosure contemplates that the modulation for the audio signaling can occur within DAC 242, microcontroller 250, or another component (not shown) positioned in between DAC 242 and microcontroller 250.

Microcontroller 250 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Memory 270 can include various types of memories, including working memory in the form of random-access memory (RAM) 272 and read-only memory (ROM) 274. Additionally, various types of memory can be utilized in place of, or in addition to, memory 270. For example, the one or more sequences of instructions for operating the reader device 230 can be stored as the bootloader software or firmware in a ROM 212 within microcontroller 250 or in the ROM 274 within memory 270. One or more sequences of instructions can also be software stored and read from another storage medium, such as the flash memory array, or received from the host computing device (e.g., a mobile device such as a smart phone or tablet computing device) via a host interface. ROM, storage mediums, and flash memory arrays represent examples of machine or computer readable media storing instructions/code executable by microcontroller 250. Machine or computer readable media may generally refer to any medium or media used to provide instructions to microcontroller 250, including both volatile media, such as dynamic memory used for storage media or for buffers within microcontroller 250, and non-volatile media, such as electronic media, optical media, and magnetic media.

Audio output channel 244 and audio input channel 248 can form a portion of an audio bus or connector 231, such as a standard 3.5 mm audio plug (not shown) or other audio connector type with any number of terminals. In some implementations, audio input channel 248 can include multiple audio input channels, such as a left-audio input channel and a right-audio input channel.

Media interface 260 can form a device, or portion thereof, for reading media located on credit cards, debit cards, or objects to obtain payment information, such as chip 284 on media item 280. As noted above, the media interface can be configured to support reading of chips on ICC's, in contact and contactless ways. However, as also noted above, the media interface 260 can be configured to read information from any other type of physical storage medium, such as magnetic storage media (e.g., magnetic stripe media), optical storage media (e.g., barcodes or patterns), and radio-frequency identification (RFID) storage devices, to name a few. Alternatively or in addition to the capability of reading such passive media, the media interface 260 can also be configured in some implementations to provide a wireless or wireline interface for interacting with other devices to provide such payment information. It should be noted that although FIG. 2B shows media item 280 as an ICC including both a chip 284 and a magnetic stripe 282 for conventional magnetic stripe POS terminals, in some implementations, the magnetic stripe 272 is optional or a different type of media can be provided for other types of POS terminals.

As noted above, the reader device 230 also includes a power supply 285 for providing electrical power to the various components therein. Power supply 285 can be provided in a variety of ways. In some configurations, the power supply 285 can be implemented as a battery. In other embodiments, power supply 285 can be configured from drawing power from connector 231. For example, power supply 285 can be a transformer and/or charge pump device that can provide any operating voltages needed. In such a configuration, the other components can be designed to limit the amount of electrical power drawn. In still other configurations, both techniques can be combined.

In operation, the components shown in FIGS. 2A and 2B operate as follows. First, the reader device 230 is plugged into host device 200. This results in the initialization of the various components in the reader device 230. A corresponding merchant transaction processing application can then be contemporaneously invoked at the host device 200. This merchant transaction processing application can operate on microprocessor 250 or some other processor on host device 200. Upon its invocation, the merchant transaction processing application begins an initialization process, as described above with respect to FIG. 1, to establish communications between the reader device 230 and the host device 200.

As described above, contemporaneously with the initialization of the reader device 230 and establishment of communications with the host device 200, the host device 200, via the communications subsystem 222, can communicate with a certificate authority server to request and receive the CAPK index. The CAPK index can then be stored in memory 224 for future use. As noted above, this process can alternatively involve the microprocessor 210 receiving information to verify a CAPK index previously stored in memory 224 is up to date and perform an update process, if needed. It should be noted that the present disclosure contemplates that checking and updating processes can be performed at any time, not just when the reader device 230 is plugged in or the merchant transaction processing application is initiated by the microprocessor 210.

Once the reader device 230 and the host device 200 are initiated, the resulting POS terminal device can await for detection of a media item 280 at media interface 260 by the microcontroller 250 of reader device 230. In the case the media item includes a chip 284, as shown in FIG. 2B, the microcontroller 250 can then make two requests, as noted above with respect to FIG. 1. First, the microcontroller 250 can generate for the chip 284 to obtains the ICC application information for the chip 284 at media interface 260. Contemporaneously, the microcontroller also assembles and transmits a request for keys to the host device 260 via output channel 244. As noted above, prior to transmitting such a request, the microcontroller 250 can first check to see whether the keys for the ICC application are already available within memory 270 and thus avoid the need for the request.

At the host device 200, the request is received via the input channel 206 and the microprocessor 210 can access memory 224 and select and retrieve keys for reader device 230. As noted above, these keys can be selected in a variety of ways. Thereafter, the keys can be transmitted, via the output channel 208, to the reader device 230. As noted above, the host device and the reader device 230 are configured so that the keys are received at reader device 230 concurrently with completion of identification for the ICC application for chip 284.

At the reader device, the keys are received via input channel 248 and analyzed at microcontroller 250 to determine whether any of the keys correspond to the ICC application for the ICC chip at media interface 260. If one of the keys corresponds, the ICC chip is authenticated using the corresponding key and the microcontroller 250 transmits financial information back to the host device via output channel 244, where the host device 200 can complete the transaction, as described above, via the merchant transaction processing application executing on microprocessor 210 and communications subsystem 222.

If none of the keys correspond, the microcontroller 250 assembles a second request for keys from the host device 200, specifying the key required and transmits the request to the host device 200 via output channel 244. Thereafter, the microprocessor 210 receives the second request via input channel 206, obtains the key from memory 224, and transmits the key back to reader device 230 via output channel 280. After receiving the key via input channel 248, the microcontroller 250 can authenticate the ICC chip and transmit financial information back to the host device via output channel 244, where the host device 200 can complete the transaction, as described above, via the merchant transaction processing application executing on microprocessor 210 and communications subsystem 22.

Figure 3:
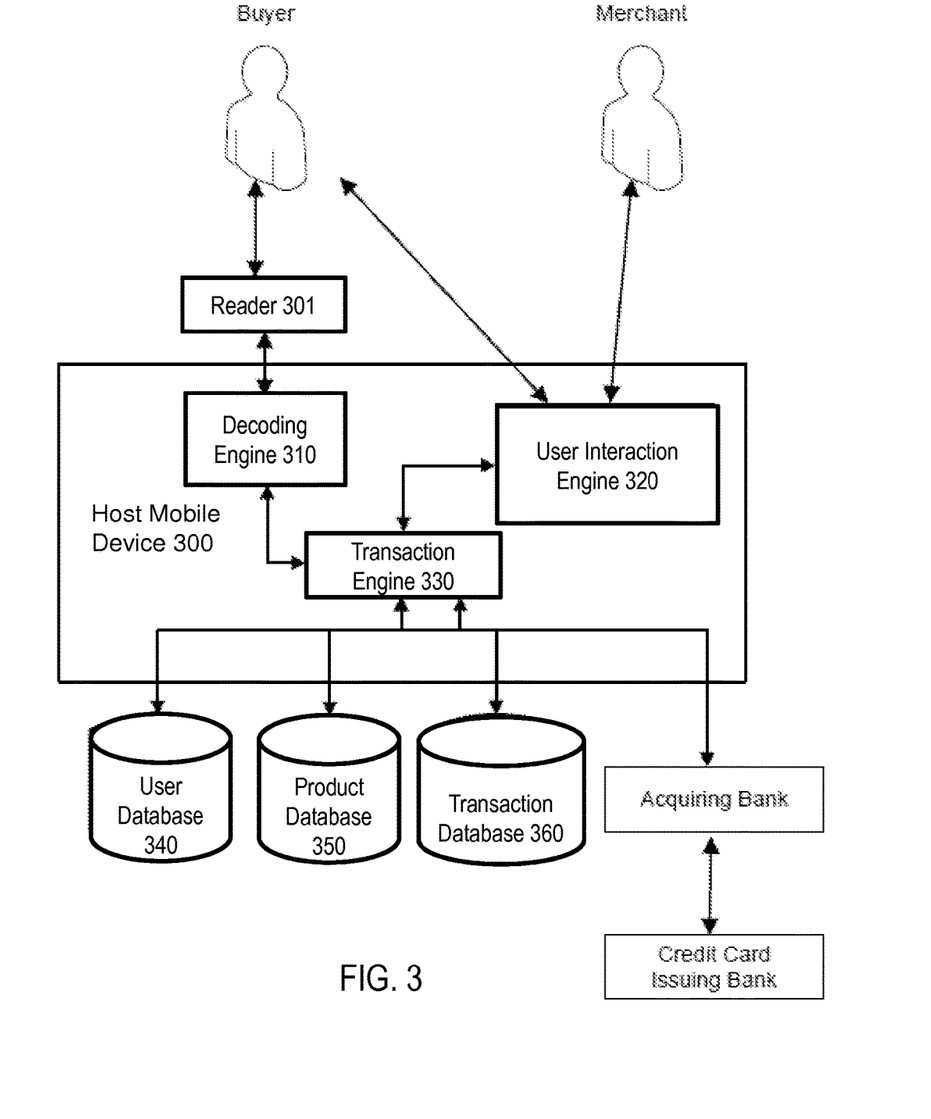
FIG. 3 depicts a conceptual environment in which a reader device of the subject technology can be used to facilitate a financial transaction between a buyer and a merchant.

FIG. 3 depicts a conceptual environment in which a reader of the subject technology can be used to facilitate a financial transaction between a buyer and a merchant. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 3, the system includes a mobile device 300, a reader 301 connected to mobile device 300, a decoding engine 310, a user interaction engine 320, and a transaction engine 330, all running on mobile device 300. Additionally, the system may also include one or more of a user database 340, a product or service database 350, and a transaction database 360, all coupled to the transaction engine 330.

As used herein, the term engine refers to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 3, mobile device 300 to which reader 301 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 300 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 330 running on mobile device 300. In response to a financial transaction between a buyer and a seller, mobile device 300 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 3, reader 301 is configured to read data encoded in a smart card, including, as discussed above, contact and contactless smart cards. The size of reader 301 can be miniaturized to be portable for connection with mobile device 300. For example, the size of card reader 301 can be miniaturized to an overall length of less than 1.5". In addition, the miniaturized card reader 301 is also designed to reliably read the card with minimum error via a single swipe by counteracting vendor specific filtering done by mobile device 301. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra-density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While various embodiments of the present technology have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the present technology has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Also, the terms "about", "substantially", "approximately", or variants thereof, as used herein with respect to a stated value or a property, are intend to indicate being within 20% of the stated value or property, unless otherwise specified above. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A point of sale system, comprising:
a portable computing device including a merchant transaction processing application and a first storage device configured to store a certificate authority public key (CAPK) index, the CAPK index comprising a plurality of public keys, each of the plurality of public keys corresponding to at least one integrated circuit card (ICC) application; and
an ICC reader removably coupled to the portable computing device and having a second storage device with a smaller storage capacity than the first storage device, the second storage device storing instructions for detecting an insertion of an ICC into the ICC reader and reading data from the ICC using at least one of the plurality of public keys in the CAPK index stored in the first storage device, the instructions for reading the data from the ICC configured for causing the ICC reader to perform the steps of:
identifying an ICC application type associated with the ICC,
requesting additional application information from the ICC for identifying the ICC application at the ICC,
receiving the additional application information from the ICC,
before receiving the additional application information from the ICC, pre-fetching one or more first keys of the plurality of public keys in the CAPK index from the portable computing device based on the ICC application type associated with ICC,
determining that one of the one or more first keys corresponds to the ICC application, based on the additional application information,
after determining that the one of the one or more first keys corresponds to the ICC application, using the one of the one or more first keys to authenticate the ICC and read the ICC, and
enabling the merchant transaction processing application to perform a financial transaction between a customer associated with the ICC and a merchant using financial information associated with the ICC.

2. The point of sale system of claim 1, wherein the plurality of public keys are associated with a plurality of ICC applications, and wherein the portable computing device is configured for:
selecting as the one or more first keys a portion of the plurality of public keys corresponding to ones of the plurality of ICC applications most commonly used for the ICC application type.

3. The point of sale system of claim 1, wherein pre-fetching the one or more first keys is also based on the additional application information, and wherein the instructions for reading the data from the ICC are further configured for causing the ICC reader to perform of the steps of:
before pre-fetching the one or more first keys, pre-fetching one or more second keys of the plurality of public keys in the CAPK index from the portable computing device based on the ICC application type associated with the ICC, and
before pre-fetching the one or more first keys, determining that none of the one or more second keys corresponds to the ICC application.

4. A system for accessing smart card data, the system comprising:
a data structure stored on a host device that is network-connected, wherein the data structure comprises a plurality of keys, each of the plurality of keys corresponding to at least one application of a plurality of applications; and
a smart card reader removably coupled to the host device, the smart card reader including a processor and a computer readable medium having stored thereon instructions that, when executed by the processor, cause the processor to perform operations comprising:
identifying an application type associated with the smart card,
sending, from the smart card reader to the host device, a request for one or more first keys that correspond to the application type of the plurality of keys from the data structure,
reading additional application information from the smart card, the additional application information identifying an application of the smart card of the plurality of applications,
pre-fetching the one or more first keys from the data structure based on the application type before completing reading the additional application information from the smart card,
determining, based on at least the additional application information, that one of the one or more first keys corresponds to the smart card, and
accessing secure information from the smart card using the one of the one or more first keys in response to determining that the one of the one or more first keys corresponds to the smart card, wherein access to the secure information requires the one of the one or more first keys.

5. The system of claim 4, wherein execution of the instructions by the processor causes the processor to perform further operations comprising:
enabling transaction processing of a financial transaction between a merchant and a customer using the secure information from the smart card.

6. The system of claim 5, wherein execution of the instructions by the processor causes the processor to perform further operations comprising:
before pre-fetching the one or more first keys, pre-fetching one or more second keys of the plurality of keys in the data structure from the host device based on the application type associated with the smart card, and
before pre-fetching the one or more first keys, determining that none of the one or more second keys corresponds to the application of the smart card.

7. The system of claim 4, wherein the application type corresponds to a credit card.

8. The system of claim 4, wherein the one or more keys are a predefined selection of the plurality of keys.

9. The system of claim 4, wherein the one or more keys are selected from the plurality of keys based on a location of the host device.

10. The system of claim 4, wherein the smart card reader comprises an integrated circuit card reader configured in accordance with a Europay-Mastercard-Visa (EMV) standard.

11. The system of claim 4, wherein the data structure is a certificate authority public key (CAPK) index, and wherein the host device retrieves at least a subset of the CAPK index from a certificate authority (CA) server.

12. The system of claim 11, wherein the host device performs operations comprising:

comparing the CAPK index at the host device to a version of the CAPK index at the CA server; and updating the CAPK index at the host device in response to comparing the CAPK index at the host device to the version of the CAPK index at the CA server.

13. A method for conducting a financial transaction between a merchant and a customer using a smart card reader coupled to a host device that is network-connected, the method comprising:

identifying, via the smart card reader, an application type associated with a smart card;

sending, from the smart card reader to the host device, a request for one or more first keys that correspond to the application type of a plurality of keys from a data structure stored at the host device;

reading additional application information from the smart card, the additional application information identifying an application of the smart card of a plurality of applications;

pre-fetching, at the smart card reader and from the data structure, the one or more first keys associated with the application type associated with the smart card before completing reading the additional application information from the smart card;

determining, based on the additional application information, that one of the one or more first keys corresponds to the application associated with the smart card;

accessing secure information from the smart card at the smart card reader using the one of the one or more first keys in response to determining that the one of the one or more first keys corresponds to the application associated with the smart card; and enabling transaction processing of the financial transaction between the merchant and the customer using the secure information from the smart card.

14. The method of claim 13, wherein the data from the smart card comprises financial information associated with a financial account associated with the customer, wherein transaction processing of the financial transaction between the merchant and the customer comprises enabling a transfer from the financial account associated with the customer to a financial account associated with the merchant.

15. The method of claim 13, wherein the application type corresponds to a credit card.

16. The method of claim 13, wherein the application type corresponds to a debit card.

17. The method of claim 13, further comprising:

identifying, at the smart card reader, a second application associated with the smart card;

ascertaining that a second one of the one or more first keys corresponds to the second application associated with the smart card; and in response to ascertaining that the second one of the one or more first keys corresponds to the second application associated with the smart card, reading second secure information from the smart card using the second one of the one or more first keys.

18. The method of claim 13, wherein the application type corresponds to an automated teller machine (ATM) card.

19. The method of claim 13, further comprising:

before pre-fetching the one or more first keys, pre-fetching one or more second keys of the plurality of keys in the data structure stored at the host device based the application type associated with the smart card, and before pre-fetching the one or more first keys, determining that none of the one or more second keys corresponds to the application associated with the smart card.

* * * * *